UNITED STATES PATENT OFFICE.

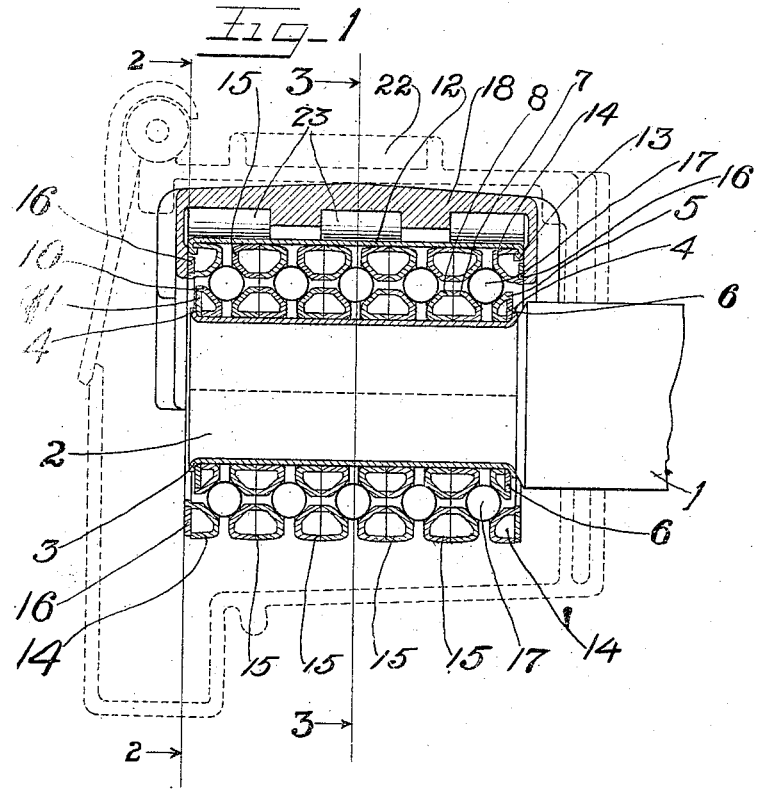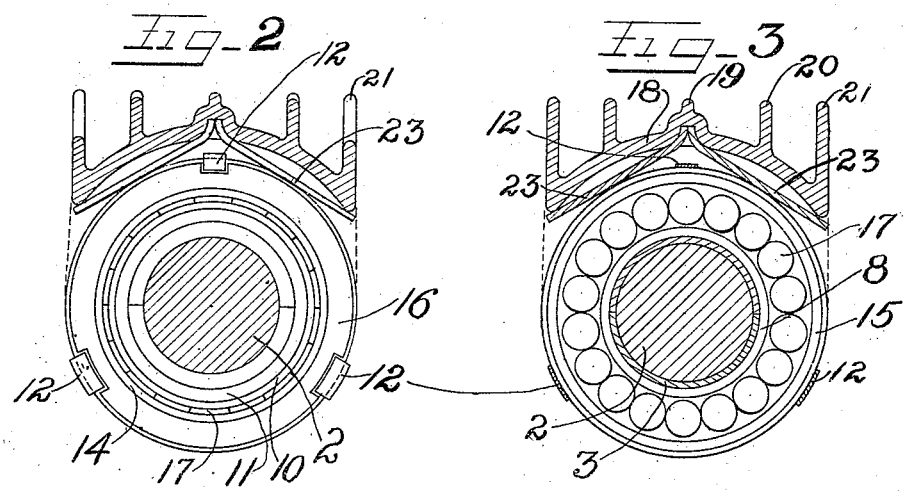

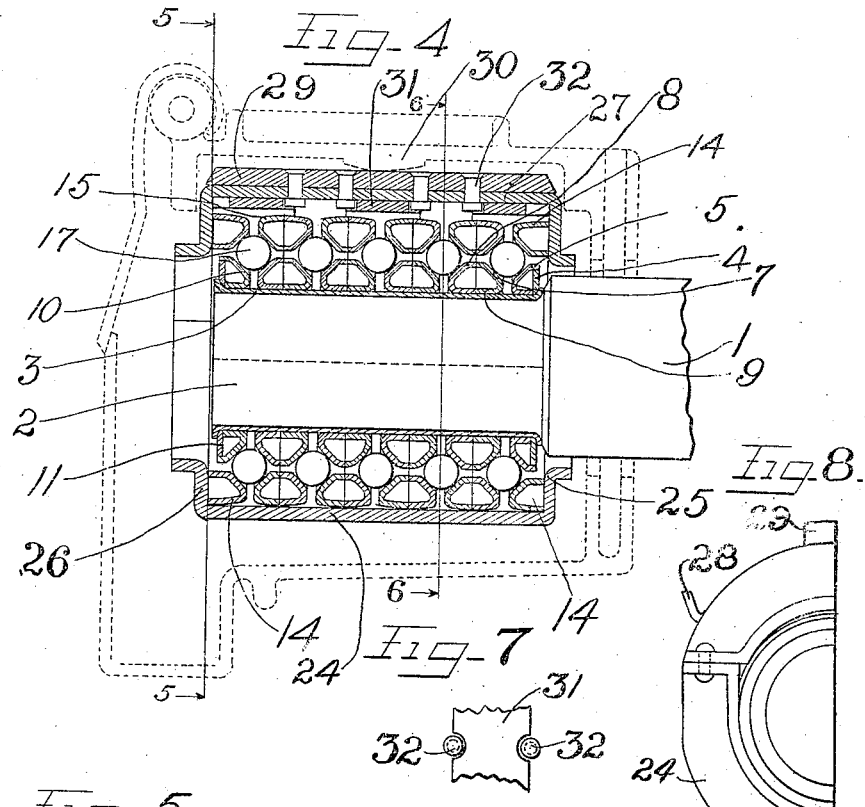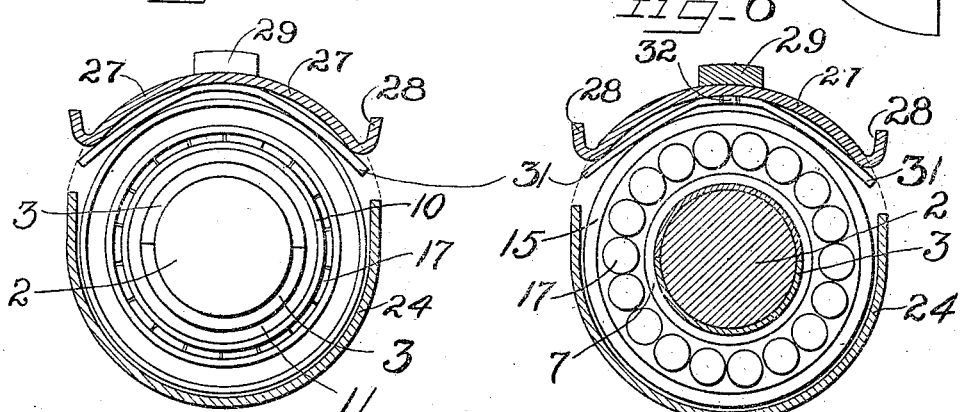

ANDREW F. HOWE, OF GRANITE CITY, ILLINOIS.

ANTIFRICTION JOURNAL-BEARING.

992,504.

Specification of Letters Patent.  Patented May 16, 1911.

Application filed August 30, 1909. Serial No. 515,167.

*To all whom it may concern:*

Be it known that I, ANDREW F. HOWE, a citizen of the United States, and a resident of the city of Granite City, in the county of Madison and State of Illinois, have invented certain new and useful Improvements in Antifriction Journal-Bearings; and I do hereby declare that the following is a full, clear, and exact description of the same, reference being had to the accompanying drawings, and to the numbers of reference marked thereon, which form a part of this specification.

This invention relates to improvements in anti-friction journal bearings and is shown more particularly as a ball journal bearing for cars.

Many attempts have been made in the past to perfect a ball bearing for railway rolling stock. As a rule, however, the same have proven inefficient from any one or more of several causes and excepting from an occasional experimental use, ball bearings have not been used for railway cars of the heavier type and for general service. One reason for this is to be found in the fact that railway constructions are quite generally standardized, such, for instance, as truck pedestal and journal constructions and these standards are not such as to permit of ready adaptation of ball or anti-friction bearings such as heretofore devised without material changes, which would entail very large expense. Furthermore, owing to the character of the service exacted from such constructions and the heavy weights to be carried and supported over more or less uneven tracks, it has heretofore proven difficult to provide anti-friction or ball bearings for such purposes adaptable for the service. Of course, the longitudinal play of the journal in its bearings is such as to render it exceedingly difficult to provide a bearing capable of withstanding the shock due thereto and in those few attempts to adapt such bearings to such journals, the result has proven disappointing because of the short life and unreliable service of the bearing.

The object of this invention is to afford an anti-friction ball bearing for railway rolling stock journals in which any desired number of ball races may be provided and which enable as many sets of balls to be employed to support the superposed load upon the journal as may be desired.

It is also an object of the invention to afford a construction in which the cups and cones, while possessing the requisite rigidity to keep the bearings at all times in proper alinement, are nevertheless elastic to a sufficient degree to absorb shock due to the end play of the journal.

Furthermore, it is an object of the invention to afford a construction in which the ball bearing may be installed in substantially any standard truck pedestal without material change or shifting the column bars, thus enabling the change to be effected from standard to ball bearings without materially increasing expense.

It is further and finally an object of the invention to afford a construction of the utmost simplicity adapted to be easily and quickly assembled or dis-assembled and which, when in use, acts to reduce the journal friction to a minimum.

The invention consists in the matters hereinafter described and more fully pointed out and defined in the appended claims.

In the drawings: Figure 1 is a central section of a device embodying my invention taken longitudinally of the journal. Fig. 2 is a section on line 2—2 of Fig. 1. Fig. 3 is a section on line 3—3 of Fig. 1. Fig. 4 is a view similar to Fig. 1, and illustrating a modified arrangement of the bearing casing. Fig. 5 is a section taken on line 5—5 of Fig. 4. Fig. 6 is a section on line 6—6 of Fig. 4. Fig. 7 is a fragmentary detail of one of the bearing members. Fig. 8 is an enlarged fragmentary end elevation of the journal box.

As shown in the drawings: 1, indicates a car axle having the journal end 2, thereon, which, as shown, is constructed plain or without a fillet at the extremity.

3, indicates a sleeve constructed in two parts longitudinally divided and adapted to fit tightly on said journal, as shown in Figs. 1 and 4. Preferably the ends of said sleeve are rolled outwardly as indicated at 4, to afford stops and rigidly secured thereon are the pressed steel cones 5, the innermost of which consists of a plate of steel rolled to afford an upwardly and inwardly directed edge and a flange or hub adapted to fit tightly on the sleeve, and as shown, a bearing ring 6, is fitted against the end of said hub portion and engages beneath the forwardly and inwardly directed edge of said cone to afford a positive support therefor and also to serve as a stop at the inner end of said sleeve to hold said cone always in adjustment.

Slidably engaged on the sleeve 3, are a succession of double cone members 7 and 8, each constructed also of pressed steel to afford an inner hub member 9, and complemental upwardly inclined cone surfaces, said double cones being adapted to fit together in pairs and to meet edge to edge circumferentially. A succession of such double cones are secured upon the sleeve, the outermost of said cones 10, is constructed as before described with reference to the cone 5, and likewise having a supporting or bearing plate 11, fitted beneath the upper outer edge thereof and bearing against the end of the hub of said cone.

Inclosing the cones before described, and the complemental cups therefor, is a containing member comprising straps of metal 12, flanged inwardly at the ends and extending longitudinally of the journal and within which are engaged end bearing members 14. The end bearing members 14, correspond substantially with the cones 5 and 10, respectively, in which are engaged the inwardly directed flanges on the ends of the straps and also against the edges of which at the outer and inner ends of the bearing engage rings 16. The end bearing members are engaged by said inwardly turned flange. Intermediate said end bearing members and directly above the cones above described are double cup members 15, in each case said cup members being disposed directly around the cone members before described and affording a ball race therebetween. As shown, five sets of balls 17, are employed, though, of course, the number of races may be varied to suit the load to be supported and the service required. As shown, said bearing rings 16, are peripherally notched to be engaged by the inwardly turned ends of said straps 12, and, of course, any desired number of bars or straps may be employed. As shown, however, but three are used, arranged equal distances apart around the bearing. Fitted over the bearing thus formed is a housing 18, of cast metal flanged downwardly at its ends to engage the end bearing rings 16, and as shown, at its top provided with a central longitudinal rib 19, and lateral ribs 20—21, all of said ribs being inclined from the center toward the ends to afford to a limited extent a pivot bearing on which a slight rocking motion longitudinally the axle in the journal box indicated by 22, and shown in dotted lines, is permitted. As shown, fitted within the bearing member 18, and recessed at their inner upper edges centrally and longitudinally therein, are resilient bearing plates 23, which bear at their edges and at the center of said bearing member 18, and bear centrally at their under sides upon the cups.

The construction shown in Figs. 4 to 7 inclusive is similar in all respects to that before described with the exception that in lieu of the containing member formed by the straps 12, a pressed steel or cast casing comprising a lower partly cylindric portion 24, open at its top and in which is fitted the cups and the bearing as a whole heretofore described. Said casing 24, is flanged upwardly at its ends as indicated at 25 and 26, to afford positive bearings for the outermost cups or bearing members 14, and seated thereon is a complemental concave bearing member 27, which, as shown, is provided with upwardly directed flanges 28, at the edges thereof and a central longitudinal rib or web 29, in the center thereof on which rests a central boss 30, in the top of the journal box, as shown in Fig. 4. Resilient plates or members 31, are positively engaged in said bearing member 27, by means of rivets 32, which engage in the edges thereof, as shown in Figs. 4, and 7, said resilient bearing members or plates resting upon the periphery of the cups to afford sufficient resiliency to assist greatly in absorbing all shocks and jars imparted to the bearing and are arranged so that each of said resilient plates or straps 31, bear upon at least two sets of said cups.

The operation is as follows: The device is readily assembled by first securing the cones upon the journal sleeve and adjusting the cones as may be required to properly position the balls. The cups are next assembled in place beginning with the innermost inserting the balls in place and pressing the next set of cups inwardly until all are in place after which the cage afforded by the straps 12, may be engaged in place or the construction as a whole may be inserted in the casing afforded by the shell 24, and bearing member 27. This is accomplished, of course, after the end of the journal has been inserted into the journal box and of course, the box is jacked up to permit the adjustment of parts. When the weight is again supported upon the bearing the resilient plates 23, or 31 equalize the pressure on the cups which are all downwardly and inwardly and afford a resilient support thereon for the load supplemental to the usual pedestal or truck springs.

Of course, I am aware that details of the construction may be varied and I therefore do not purpose limiting this application for patent otherwise than necessitated by the prior art.

I claim as my invention:

1. In a ball bearing cups and cones each formed of duplicate pressed steel sections, each adapted to meet edge to edge, the one to support the thrust of the other, and resilient equalizing plates bearing on adjacent cups and adapted to unify pressure thereon.

2. In a ball bearing the combination with a car journal axle of a two part sleeve thereon, cones each comprising duplicate pressed steel sections slidably engaged on said sleeve, pressed steel cups surrounding the same, means positively engaging the cups in adjusted position, a plurality of sets of balls arranged in the races between said cups and cones and equalizing plates bearing on the cups.

3. In a device of the class described a containing member comprising longitudinal bars and rings notched to receive the ends of the bars therethrough, cups therein, a sleeve adapted to fit on the shaft or journal, cones thereon complemental with the cups and affording ball races therebetween, an equalizing member, adapted to be supported on the cups and equalizing plates secured thereto and acting to distribute the pressure thereon uniformly to the various sets of balls.

4. In a ball bearing a plurality of sets of cups and cones symmetrically arranged on and around a journal, balls in the races therebetween, a spacing and equalizing member clamping the ends of the bearings in adjusted position and equalizing plates within said equalizing member acting to distribute the pressure therefrom to the bearing.

5. In a device of the class described a journal, a two part sleeve thereon, a plurality of cones (some of which are double) secured on said sleeve, cups, (some of which also are double) secured circumferentially around the cones, a containing member inclosing the same, equalizing springs or plates bearing on said cups and an equalizing bearing member supported on said plates.

6. In a device of the class described outer pressed steel bearing members, rings engaging therein on the outer side and peripherally notched, and straps of metal hooked at the ends and engaging in said bearing members at the notches in said rings.

7. A ball bearing embracing in combination with a journal and the journal box of a plurality of cones spaced equally apart upon the journal, a plurality of cups symmetrically arranged around the same, balls in the races afforded therebetween, a member positively engaging the structure thus formed, a bearing member adapted to rock in the journal box, and resilient equalizing plates secured in said bearing member and resting on the cups.

In testimony whereof I have hereunto subscribed my name in the presence of two subscribing witnesses.

ANDREW F. HOWE.

Witnesses:
LETHA COMER,
ALVIN A. SMEIGH.